(No Model.) 2 Sheets—Sheet 1.
H. P. FEISTER.
MATCH MAKING MACHINE.
No. 603,481. Patented May 3, 1898.
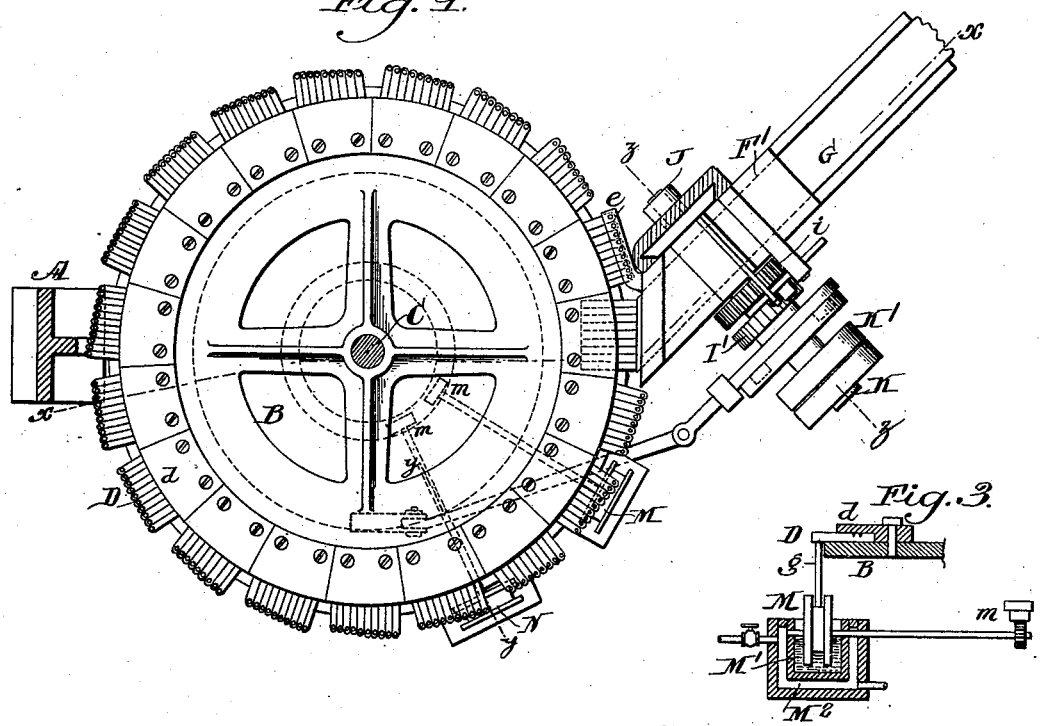
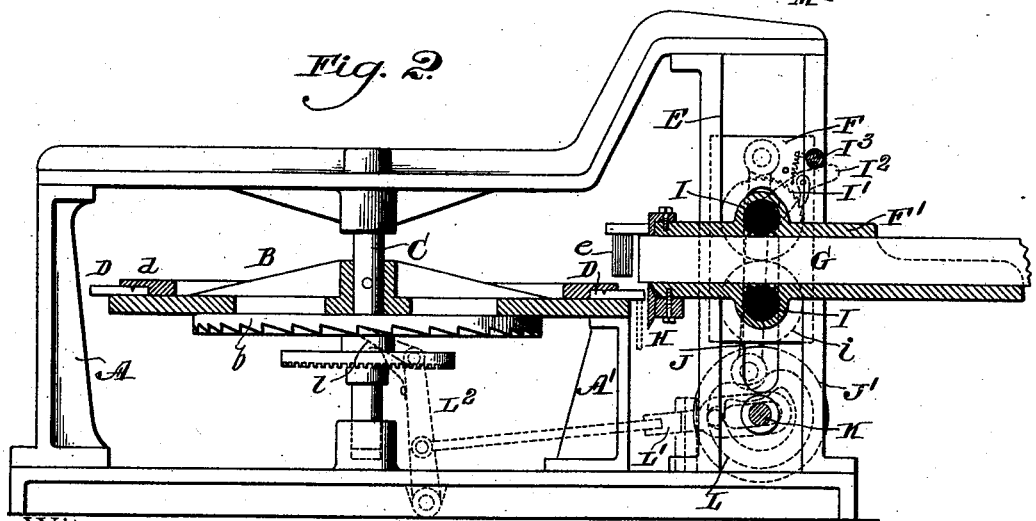
Witnesses. Inventor.
Henry P. Feister
Attorney.

(No Model.) 2 Sheets—Sheet 2.
H. P. FEISTER.
MATCH MAKING MACHINE.
No. 603,481. Patented May 3, 1898.
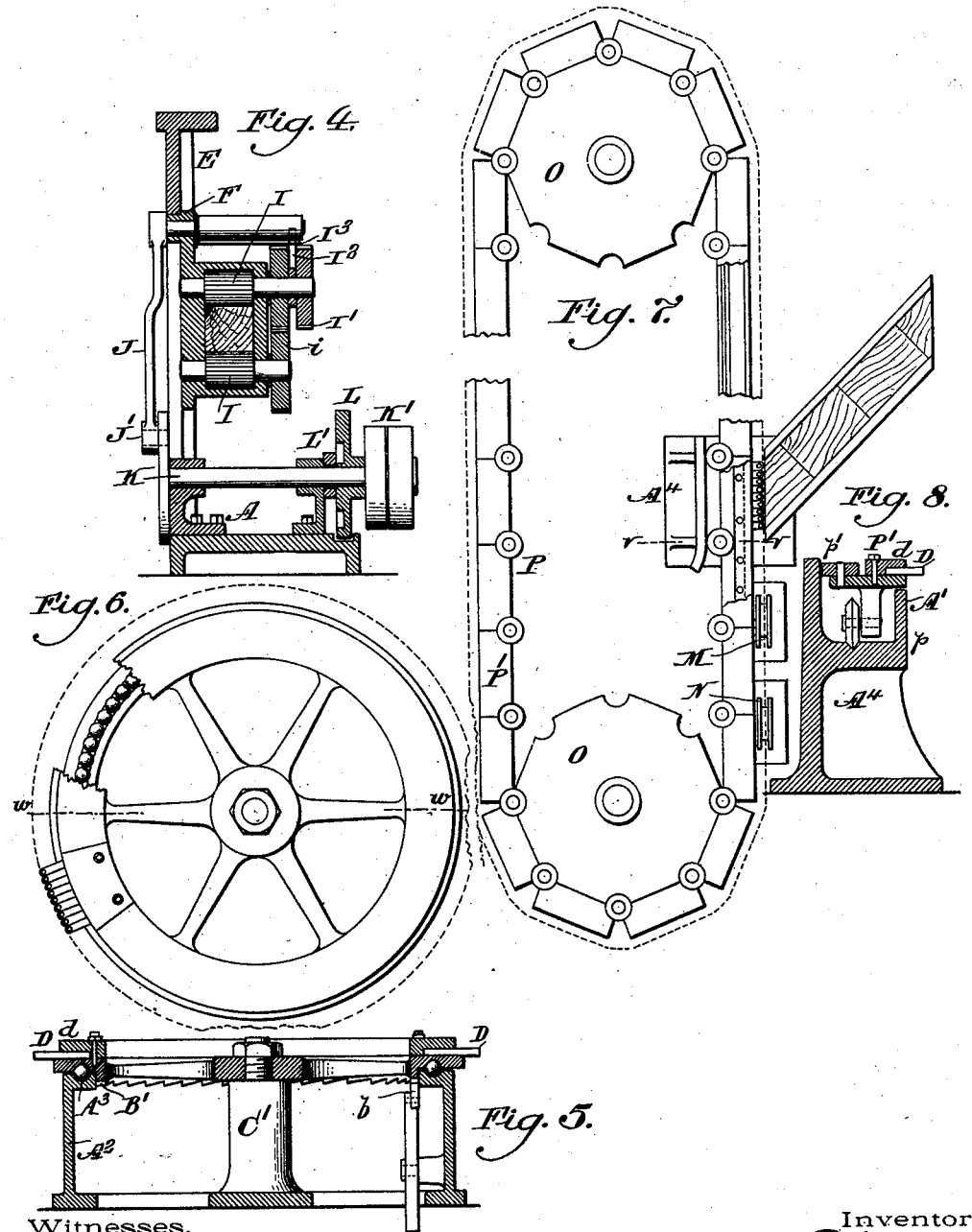
Witnesses.
Inventor.
Henry P. Feister

UNITED STATES PATENT OFFICE.

HENRY P. FEISTER, OF PHILADELPHIA, PENNSYLVANIA.

MATCH-MAKING MACHINE.

SPECIFICATION forming part of Letters Patent No. 603,481, dated May 3, 1898.

Application filed March 24, 1897. Serial No. 628,980. (No model.)

*To all whom it may concern:*

Be it known that I, HENRY P. FEISTER, of the city and county of Philadelphia, State of Pennsylvania, have invented an Improvement in Match-Making Machines, of which the following is a specification.

My invention has reference to match-making machines; and it consists of certain improvements which are fully set forth in the following specification and shown in the accompanying drawings, which form a part thereof.

The object of my invention is to provide a construction of automatic match-making machine which shall cut the match-splints from the wood and before displacing them from the cutters apply the paraffin and detonating composition or other igniting substance, as desired, whereby less space is required, and the machine shall be less complicated and more easily operated than machines of this class heretofore in use.

In carrying out my invention I provide cutters divided into series or sets, each series of cutters being firmly and rigidly secured to a carrier, preferably in the form of a circular or annular disk, which is intermittently moved so as to bring the several series or sets of cutters successively into operative position, whereby a block of wood may be moved over the cutters for the purpose of producing splints. The splints while maintained in the cutters are moved by the carriers so as to be passed over suitable devices for applying the detonating or igniting compounds, and are preferably retained in the cutters a sufficiently long time for drying purposes and until finally discharged, either before or during the formation of the next splints.

My invention comprehends certain improvements and details of construction, all of which will be more fully understood by reference to the accompanying drawings, in which—

Figure 1 is a plan view of a match-making machine embodying my invention with the upper part of the main frame removed. Fig. 2 is a sectional elevation of same on line $x\ x$. Fig. 3 is a transverse section through a portion of same on line $y\ y$. Fig. 4 is a sectional elevation on line $z\ z$. Fig. 5 is a sectional elevation of a modified form of cutter-support, taken on line $w\ w$ of Fig. 6. Fig. 6 is a plan view of same with a portion broken away. Fig. 7 is a plan view of a modified form of my invention in which the carriers are formed as a series of carriages hinged together like a chain, and Fig. 8 is a cross-section of same on line $v\ v$.

A is the main frame of the machine and may be of any shape or construction.

B is a suitable wheel or annular carrier-frame journaled to revolve about a fixed center. This may be secured to a shaft C, supported in the frame A. The rim of the wheel or carrier B is provided with a series of sets of cutters D, which may be made similar to any well-known construction of match-splint cutters, and these are clamped in position by means of clamping-plates $d$. In practice it is preferable that the cutters be arranged so that their cutting edges form a straight line, though this is not essential.

F is a vertical reciprocating frame guided in vertical guides E of the main frame A and is reciprocated vertically by means of a pitman J and a crank J′, secured to the power-shaft K, which may be driven by the band-wheels K′ or otherwise. The frame F is provided with a horizontal guide F′, arranged at an angle to a radius of the wheel or carrier B, as clearly shown in Fig. 1, and is adapted to guide the wooden blocks G somewhat tangentially toward the cutters D, which make up the periphery of the wheel or carrier B. In this manner the cutters are made to split all portions of the block and waste is avoided. The blocks G are fed through the guide F′ by means of fluted feeding-wheels I I, which are geared together by gearing $i$ and are intermittently rotated by pawl-and-ratchet devices I′, operated by the lever I² and pin I³ on the guide-frame E. It will be observed that when the frame F is fully raised the lever I² strikes the pin I³ and operates the ratchet and pawl to feed the wood G forward or toward the cutters a thickness corresponding to the diameter of a match-splint. In the descent of the frame F the wood is not fed, but is positively moved down over the cutting edges of the cutters D, producing thereby splints which remain in the cutters, as indicated in dotted lines in Fig. 2. The wood is then raised again and, when above the level of the cutters, is once more automatically fed, so as to be brought into position for being cut by the next set or series of cutters.

The carrier or wheel B is intermittently rotated to bring a new series of cutters into cutting position with each vertical reciprocation of the frame F, and this may be accomplished in any suitable manner. For the purpose of illustration I have shown a simple device for securing this result, the same consisting of a cam L upon the power-shaft K, operating a reciprocating frame L', which is connected to a rocking arm L², having a pawl $l$, which meshes with the ratchet-teeth upon the carrier or wheel B. With each revolution of the shaft K it is evident that a rotary movement will be imparted to the carrier B, and this movement is so timed that it takes place between the downward reciprocations of the frame F. To prevent springing of the wheel or carrier B during the cutting operation and when the same is pivoted on a central axis, I may employ a stationary table or anvil A', over which the rim of the carrier passes and by which its downward thrust is received.

After the match-splints are formed in the cutters as above described the intermittent rotation of the carrier brings the said match-splints into a position to pass over a grooved wheel M for applying the paraffin and then over a grooved wheel N for applying the detonating composition, after which it passes through the air and, if desired, dried by any suitable artificial means before being discharged from the cutters. The grooved wheels M and N rotate in vats M', containing the paraffin or composition, as the case may be, which is maintained in a fluid condition by heat produced by a steam-jacket M². This is shown more fully in Fig. 3. These grooved wheels may be driven by any suitable gearing—as, for instance, M'—and preferably so that the surface speed of the grooved wheels corresponds to the surface speed of the match-splints. It is immaterial to my invention what form of devices are employed for applying the paraffin and composition.

The production of the next set of match-splints in the cutters containing the finished matches will force the said finished matches out of the cutters and allow them to be received upon a conveyer or directly in the boxes, as desired. If preferred, however, splint-removing rods $e$ may be carried by an extension of the frame F', so as to discharge the finished matches from the series of cutters immediately preceding those which are forming new match-splints. The matches may be discharged directly into the boxes.

In place of supporting the carrier B upon a vertical shaft, or even in conjunction therewith, I may employ an annular table A², in which the carrier B is guided by a central annular rim or flange B' and supported upon antifriction-balls A³. The annular table A² corresponds to the thrust table or anvil A' of Fig. 2, but in this case extending all the way around. If desired, in connection with this construction a central pivot-post C' may be employed, as shown in Fig. 5, though it is evident that such is not necessary. By the employment of antifriction-balls less friction is produced and less power is required to operate the carrier, which when made very large in diameter is important. In the illustration shown I have made the diameter of the carriers small on account of the limited size of the sheets upon which the drawings are made; but it is to be understood that in practice these carriers may be of very large diameter, so as to secure an extended period of time in which the splints remain in the cutters to secure full drying thereof.

In the modification of my invention shown in Fig. 7 I employ two guide-wheels O O, about which passes an endless chain P or cutter-carriers P'. These carriers are provided with suitable guide-wheels $p'$, guided in the frame A⁴ over a greater or less portion of their orbit. As shown, the frame A⁴ is located immediately at that part where the cutting of the splints takes place, and it is provided with the extension A', corresponding to the anvil block or table of Fig. 2, to receive the downward thrust of the carrier when the cutting of the splints takes place. In this manner the cutters are securely guided both vertically and laterally and insure the proper rigidity which is necessary. The remaining features of the apparatus would be the same as in the cases previously described, and therefore no further illustration is necessary. This modification is adapted to the case where a large diameter of the carrier could not conveniently be employed.

While I prefer the construction illustrated, I do not limit myself to the details thereof, as they may be modified in various ways without departing from the principles of my invention.

What I claim as new, and desire to secure by Letters Patent, is—

1. In a match-making machine, a moving carrier having a series of splint-cutters rigidly secured to the carrier, in combination with means to intermittently move the carrier always in the same direction, a wood-guide for supporting the block of wood from which the match-splints are to be cut, and power devices for reciprocating the wood-guide relatively to the cutters and transversely to the plane of their movement.

2. In a match-making machine, a moving carrier having a series of splint-cutters rigidly secured thereto, in combination with means to intermittently move the carrier, a wood-guide for supporting the block of wood from which the match-splints are to be cut, power devices for reciprocating the wood-guide relatively to the cutters and transversely to the plane of their movement, and means for applying paraffin to the splints while retained in the custody of the cutters.

3. In a match-making machine, a moving carrier having a series of splint-cutters rigidly secured thereto, in combination with means to intermittently move the carrier, a wood-guide for supporting the block of wood from which the match-splints are to be cut, power devices for reciprocating the wood-guide relatively to the cutters and transversely to the plane of their movement, and means for applying the detonating composition to the splints while rigidly held by the carriers through the agency of the cutters.

4. In a match-making machine, a moving carrier having a series of splint-cutters rigidly secured thereto, in combination with means to intermittently move the carrier, a wood-guide for supporting the block of wood from which the match-splints are to be cut, power devices for reciprocating the wood-guide relatively to the cutters and transversely to the plane of their movement, and a thrust table or anvil for sustaining the thrust of the carrier during the cutting operation of the splints.

5. In a match-making machine, a moving carrier having a series of splint-cutters rigidly secured thereto, in combination with means to intermittently move the carrier, a wood-guide for supporting the block of wood from which the match-splints are to be cut, power devices for reciprocating the wood-guide relatively to the cutters and transversely to the plane of their movement, means for applying the detonating composition to the match-splints while in the custody of the cutters, and automatic discharging devices for discharging the finished matches from the cutters.

6. In a match-making machine, the combination of a circular carrier provided about its periphery with a series of cutters, guides to support and guide the carrier whereby it may revolve, power devices for rotating it, and a transversely-reciprocating guide for the wood from which the splints are to be made.

7. In a match-making machine, the combination of a circular carrier provided about its periphery with a series of cutters, guides to support and guide the carrier whereby it may revolve, power devices for rotating it, a transversely-reciprocating guide for the wood from which the splints are to be made, and automatic devices for feeding the wood toward the cutters with each reciprocation of the guides.

8. In a match-making machine, the combination of a circular carrier provided about its periphery with a series of cutters, guides to support and guide the carrier whereby it may revolve, power devices for rotating it, a transversely-reciprocating guide for the wood from which the splints are to be made, and a stationary anvil or support under the periphery of the carrier to receive the thrust thereof when cutting the splints.

9. In a match-making machine, the combination of a circular carrier provided about its periphery with a series of cutters, guides to support and guide the carrier whereby it may revolve, power devices for rotating it, a transversely-reciprocating guide for the wood from which the splints are to be made, and means arranged near the periphery of the carrier for applying the composition to the match-splints while in the custody of the cutters.

10. In a match-making machine, the combination of a circular carrier provided about its periphery with a series of cutters, guides to support and guide the carrier whereby it may revolve, power devices for rotating it, a transversely-reciprocating guide for the wood from which the splints are to be made, means arranged near the periphery of the carrier for applying the composition to the match-splints while in the custody of the cutters, and automatic discharging devices for removing the complete matches from the cutters prior to their passing in position to receive the block from which new splints are to be made.

11. In a match-making machine, the combination of an endless series of clamps, a series of detachable cutters held by each clamp, power devices for intermittently rotating the endless series of clamps and their cutters, a reciprocating holder for the wood from which the splints are to be made, guides for the reciprocating holder for causing it to move transversely to the plane of the cutters, and power devices to reciprocate said holder in timed relation to the movement of the series of clamps whereby they operate alternately.

12. In a match-making machine, the combination of an endless series of clamps, a series of detachable cutters held by each clamp, power devices for intermittently rotating the endless series of clamps and their cutters, a reciprocating holder for the wood from which the splints are to be made, guides for the reciprocating holder for causing it to move transversely to the plane of the cutters, power devices to reciprocate said holder in timed relation to the movement of the series of clamps whereby they operate alternately, and a fixed or stationary table or anvil adapted to receive the thrust of the clamps and cutters when cutting the splints and over which the series of clamps are caused to pass.

13. In a match-making machine, a rotary disk, combined with a series of independent clamping-sections arranged about the outer part of said disk, and a series of sets of cutters clamped rigidly upon the disk by said clamping-sections and extending radially outward from the periphery of the rotary disk in planes at right angles to the axis of rotation, whereby any series of cutters may be removed or adjusted without disturbing another series.

14. In a match-making machine, a rotary disk or wheel shaped carrier provided with a series of clamps adjacent to its periphery, combined with a series of separate sets of independent cutters clamped rigidly relatively to each other and upon the disk by said clamps and lying in planes at right angles to the axis of rotation.

15. In a match-machine, a rotary disk or carrier combined with a series of radially-projecting cutters extending outward from its periphery, a stationary support in planes at right angles to the axis of rotation, and ball-bearings between the said support and disk adjacent to the cutters to directly receive the thrust.

16. In a match-making machine, a circular carrier combined with a series of projecting cutters about its periphery, a stationary support, ball-bearings between the said support and carrier, a circular guide for guiding the carrier in a circle, and a transversely-movable wood-guide for moving the wood across the plane of the cutters.

17. In a match-making machine, the combination of a movable carrier provided with a series of sets of cutters adapted to be brought into cutting position successively, power devices for moving the carrier and its cutters intermittently in the same direction to bring the series of sets of cutters successively before a wood-guide, a reciprocating wood-guide movable transversely to the line of travel of the cutters, power devices to reciprocate the wood-guide so as to move the wood held thereby over the cutters of a set when held stationary, and connecting devices between the devices for moving the carrier and the power devices for reciprocating the wood-guide whereby the cutters are held stationary while the wood-guide is moved transversely to cause the wood to pass over the cutters, and when the wood-guide is moved out of cutting position the carriers and cutters are moved to bring the next set of cutters into operative cutting position.

In testimony of which invention I have hereunto set my hand.

HENRY P. FEISTER.

Witnesses:
BENJ. L. LEHMAN,
CHARLES WANICH.